United States Patent
Loison

(10) Patent No.: US 8,882,030 B2
(45) Date of Patent: Nov. 11, 2014

(54) AUTONOMOUS ELECTRICITY PRODUCTION AND CONDITIONING SYSTEM FOR AN AIRCRAFT, ASSOCIATED AIRCRAFT AND METHOD

(75) Inventor: Renaud Loison, Paris (FR)

(73) Assignee: Dassault Aviation, Paris (FR)

( * ) Notice: Subject to any disclaimer, the term of this patent is extended or adjusted under 35 U.S.C. 154(b) by 164 days.

(21) Appl. No.: 13/471,801

(22) Filed: May 15, 2012

(65) Prior Publication Data

US 2012/0291426 A1  Nov. 22, 2012

(30) Foreign Application Priority Data

May 18, 2011 (FR) ...................................... 11 01511

(51) Int. Cl.
  *B64D 41/00* (2006.01)
  *B64D 13/06* (2006.01)

(52) U.S. Cl.
  CPC ........ *B64D 13/06* (2013.01); *B64D 2013/0644* (2013.01); *B64D 41/00* (2013.01); *Y02E 20/14* (2013.01); *B64D 2241/00* (2013.01); *Y02T 50/44* (2013.01); *Y02T 50/56* (2013.01)
  USPC .......................................... 244/58; 244/53 A

(58) Field of Classification Search
  USPC ................................. 244/58, 53 A
  See application file for complete search history.

(56) References Cited

U.S. PATENT DOCUMENTS

| | | | |
|---|---|---|---|
| 2,618,470 A | 11/1952 | Brown et al. | |
| 3,472,029 A * | 10/1969 | Colley | 60/771 |
| 3,659,417 A * | 5/1972 | Grieb | 60/785 |
| 3,965,673 A * | 6/1976 | Friedrich | 60/788 |
| 4,091,613 A * | 5/1978 | Young | 60/785 |
| 4,684,081 A | 8/1987 | Cronin | |
| 4,815,277 A * | 3/1989 | Vershure et al. | 60/787 |
| 4,819,423 A * | 4/1989 | Vershure et al. | 60/778 |
| 5,442,904 A | 8/1995 | Shnaid | |
| 5,490,645 A | 2/1996 | Woodhouse | |
| 5,813,630 A | 9/1998 | Williams | |
| 5,956,960 A | 9/1999 | Niggeman | |
| 6,450,447 B1 * | 9/2002 | Konrad et al. | 244/53 R |
| 7,207,521 B2 * | 4/2007 | Atkey et al. | 244/58 |
| 7,210,653 B2 * | 5/2007 | Atkey et al. | 244/58 |
| 7,380,749 B2 * | 6/2008 | Fucke et al. | 244/58 |
| 8,016,228 B2 * | 9/2011 | Fucke et al. | 244/58 |
| 2006/0237583 A1 | 10/2006 | Fucke | |
| 2007/0267540 A1 * | 11/2007 | Atkey et al. | 244/58 |
| 2007/0271952 A1 | 11/2007 | Lui et al. | |
| 2007/0284480 A1 * | 12/2007 | Atkey et al. | 244/135 R |
| 2009/0309364 A1 * | 12/2009 | Marconi | 290/52 |

FOREIGN PATENT DOCUMENTS

| | | |
|---|---|---|
| EP | 0657351 A1 | 6/1995 |
| EP | 1860026 A2 | 11/2007 |
| WO | 98/13258 A1 | 4/1998 |
| WO | 99/12810 A1 | 3/1999 |

\* cited by examiner

*Primary Examiner* — Philip J Bonzell
(74) *Attorney, Agent, or Firm* — Dowell & Dowell, PC

(57) ABSTRACT

An environmental control system including an upstream assembly supplying outside air to a rotary system of an aircraft, the air not having passed through a propulsion engine of the aircraft, and wherein the rotary system includes a rotary shaft, a power turbine, a compressor and a cold turbine, and wherein the upstream supply assembly is connected to an inlet of the compressor mounted with the rotary shaft that is rotated by the power turbine and wherein the shaft is supplied with compressed gas from the compressor toward the cold turbine.

16 Claims, 10 Drawing Sheets

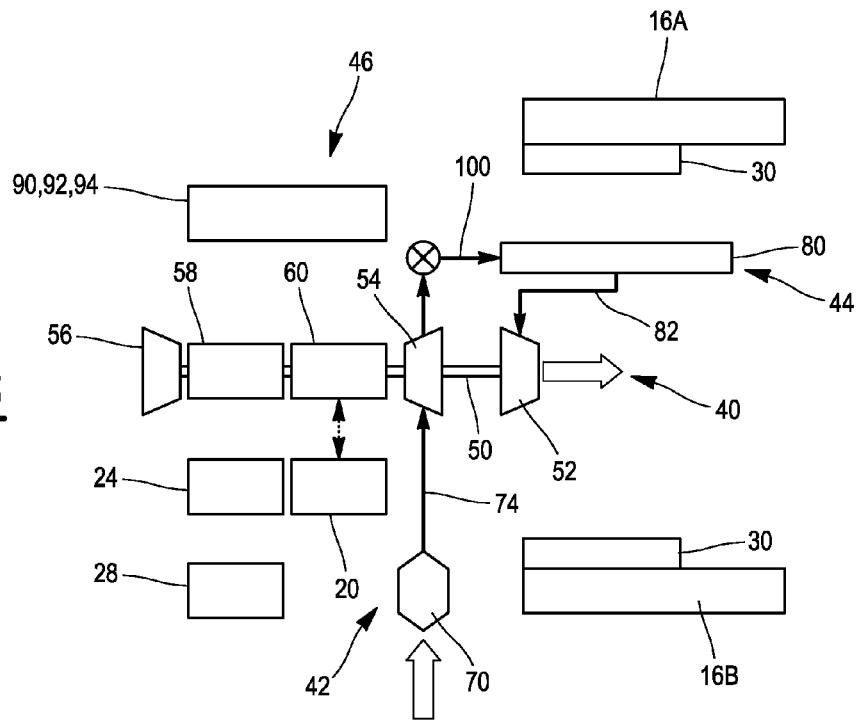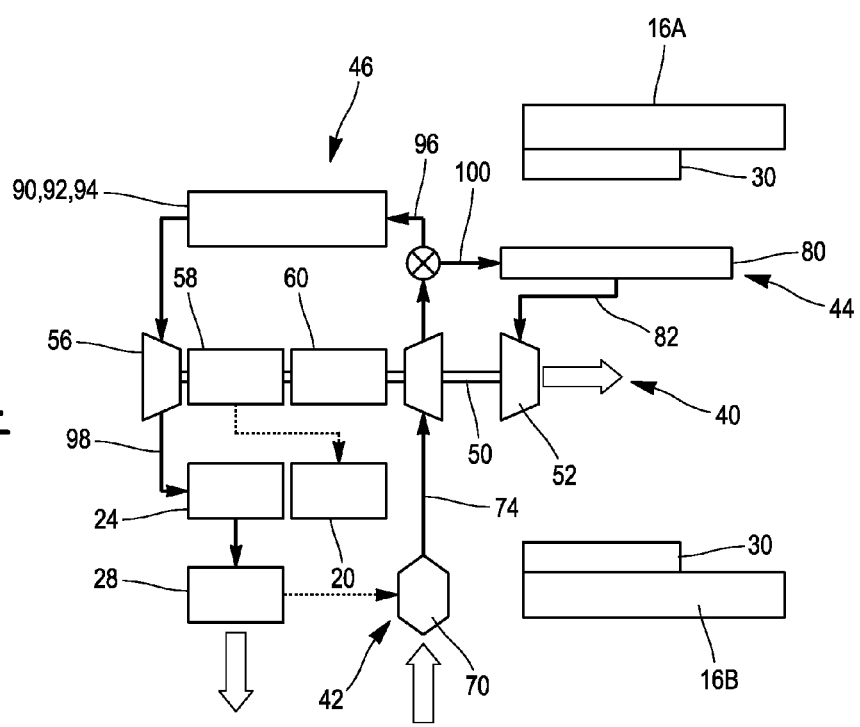

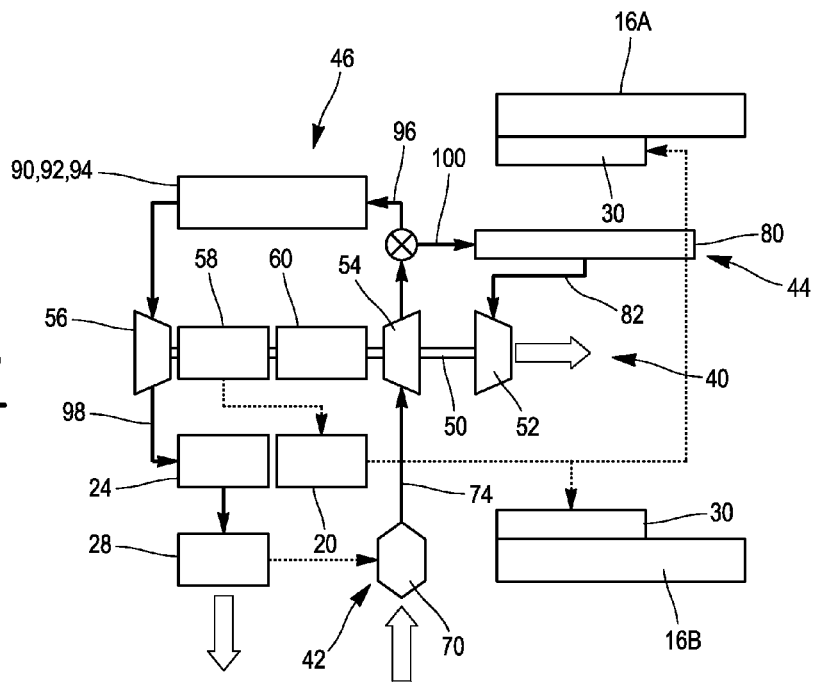
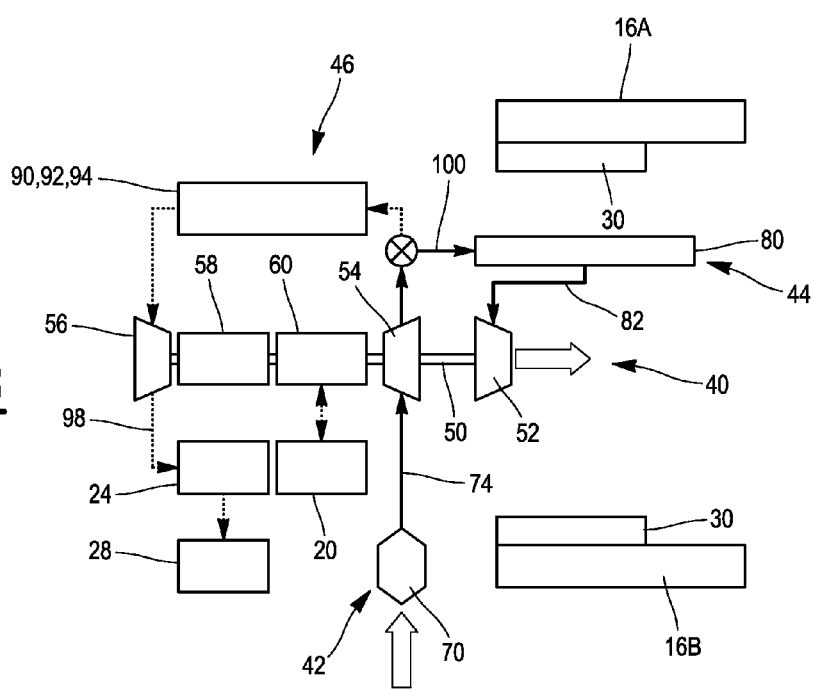

AUTONOMOUS ELECTRICITY PRODUCTION AND CONDITIONING SYSTEM FOR AN AIRCRAFT, ASSOCIATED AIRCRAFT AND METHOD

BACKGROUND OF THE INVENTION

1. Field of the Invention

The present invention relates to an autonomous electricity production and conditioning system for an aircraft, including:
- a rotary shaft;
- a compressor mounted integral with the rotary shaft;
- a power turbine capable of rotating the rotary shaft;
- a cold expansion turbine rotated by the rotary shaft and supplied with a compressed gas from the compressor.

Such a system is in particular intended to be used on a civilian aircraft, such as a passenger and/or freight airplane, or on any other flying vehicle.

2. Brief Discussion of the Prior Art

In aircrafts, it is necessary to have a system performing temperature, pressure and hygrometry conditioning functions of the aircraft. Such a system is generally designated as an "Environmental Control System" or "ECS."

Such a system comprises a compressor and a cold turbine mounted on a same shaft. The compressor is generally fed with air from an engine withdrawal or from an air turbogenerator. The compressed air, after cooling and drying, is expanded in the cold turbine to produce the frigories necessary for conditioning of the aircraft.

Generally, the aircraft is also provided with an air turbogenerator (ATG, also called APU, or "auxiliary power unit") intended to produce electricity and air for the aircraft's needs. This turbogenerator includes a power turbine supplied with combustion gases produced in a combustion chamber independent of the engine(s) of the apparatus. A compressor is mounted on the shaft of the power turbine to allow pressurized air production on the ground, and to supply the combustion chamber.

The presence of these two systems on a same aircraft has drawbacks in terms of weight and bulk.

To offset this problem, US 2010/0170262 describes an autonomous system of the aforementioned type, in which a power turbine supplied by a combustion chamber, a compressor, and a cold expansion turbine intended to produce a cold gas for the environmental control system are mounted on a same shaft.

To feed the compressor, a withdrawal is done in a low-pressure zone of a propulsion engine of the aircraft. This withdrawal provides hot air leaving the engine to supply the intake of the compressor. This hot air is generally conveyed to the compressor by passing through a heat exchanger to condition it at the right temperature.

Such a system reduces the onboard weight and volume, while preserving the necessary functionalities for the aircraft. Thus, when the propulsion engines are turned off, the combustion chamber can be activated to rotate the power turbine, the compressor and the cold turbine so as to allow conditioning of the cabin. Furthermore, when an alternator is driven by the shaft supporting the turbines and the compressor, the rotation of the alternator creates electricity necessary for the needs of the aircraft, in the absence of primary electricity production provided by the alternators coupled to the engines of the aircraft.

Once the engines are started, they supply the conditioning system(s) with air.

Such an assembly is not fully satisfactory, in particular on civilian airplanes. In fact, all of the gas provided at the intake of the compressor comes from the engine.

When the engine is off, or when it is not working correctly, the compressor must suction air through the immobile blades and the structure of the engine, which significantly increases the pressure loss to be overcome. The compressor must therefore be oversized, which increases its bulk, mass and consumption. Furthermore, the engine air withdrawal intended for the compressor of the conditioning system directly influences the thermodynamic cycle of the engine, which increases the consumption thereof.

Furthermore, the existing standards on civilian airplanes require a maximum usage temperature of the engine gases that is restrictive. This temperature is 204° C. However, the temperature of the withdrawn gases is much higher, for example in the vicinity of 260° C. These gases must therefore be cooled by an air-air exchanger before being conveyed into the aircraft, which causes significant energy consumption.

The sizing of the system, and in particular of the air intakes in the engine, is complex to perform, and requires compromises between optimal thermodynamic use of the engine and the conditioning system.

SUMMARY OF THE INVENTION

One aim of the invention is to obtain an autonomous power production and conditioning system that is compact and light, while being more economical in terms of fuel consumption.

To that end, the invention relates to a system of the aforementioned type, characterized in that the system comprises an upstream assembly supplying outside air to the aircraft not having passed through a propulsion engine of the aircraft, the upstream supply assembly being connected to an inlet of the compressor.

The system according to the invention may include one or more of the following features, considered alone or according to any technically possible combination:
- It comprises a combustion chamber, independent of the or each propulsion engine of the aircraft, the system including a channel for supplying the power turbine with at least one combustion gas from the combustion chamber;
- It comprises a hose for withdrawing a compressed gas from the compressor emerging in the combustion chamber;
- It comprises an auxiliary compressor arranged downstream of the compressor and upstream of the cold turbine to receive at least part of the compressed gas from the compressor, the withdrawal hose being tapped between the compressor and the auxiliary compressor upstream of the auxiliary compressor;
- The auxiliary compressor is rotated by the rotary shaft;
- The auxiliary compressor is positioned away from the rotary shaft, the system comprising an auxiliary motor for rotating the auxiliary compressor, advantageously an electric motor rotated by electricity supplied by an electrical network of the aircraft;
- The supply assembly comprises an upstream heat exchanger capable of placing the air outside the aircraft not having passed through a propulsion engine of the aircraft in a heat exchange relationship with at least part of the compressed gas from the compressor;
- It comprises a downstream heat exchanger, a condenser, and a separator that are capable of receiving at least part of the compressed gas from the compressor, to produce a compressed gas intended to be introduced into the cold turbine, the condenser being able to place a cooled expanded gas from the cold turbine in heat exchange with a compressed gas from the downstream heat exchanger;

It comprises at least one gas distribution hose for an expanded gas from the cold turbine toward an enclosure of an aircraft intended to be conditioned;

It comprises a member for transmitting the rotational movement of the rotary shaft mechanically connected to the rotary shaft, advantageously a speed reducer;

It comprises a main alternator mechanically connected to the rotary shaft; and

It comprises a secondary alternator separate from the main alternator, the secondary alternator being mechanically connected to the rotary shaft.

The invention also relates to an aircraft comprising a system as defined above and a fuel storage device, the storage device advantageously comprising:

at least one main reservoir, the or each main reservoir being intended to contain a first batch of fuel;

at least one feed line for supplying a propulsion engine of the aircraft with the first batch of fuel contained in the main reservoir;

at least one auxiliary reservoir, designed to contain a second batch of fuel separate from the first batch of fuel, the auxiliary reservoir being connected to the main reservoir, the device comprising an intake line for bringing the second batch of fuel contained in the auxiliary reservoir toward a combustion chamber of the aircraft independent of the or each engine of the aircraft.

The invention also relates to a method for conditioning an aircraft, including the following steps:

providing a system as defined above;

activating the power turbine to rotate the rotary shaft;

jointly rotating the compressor and the expansion turbine;

supplying the compressor with air outside the aircraft not having passed through a propulsion engine of the aircraft.

The method according to the invention includes one or more of the following features, considered alone or according to any technically possible combination:

The system comprises a combustion chamber, the method including the following steps:

activating the combustion chamber to produce a combustion gas;

supplying the power turbine with the combustion gas;

withdrawing at least part of the compressed gas from the compressor to supply the combustion chamber;

It comprises a step for introducing, into the cold turbine, a compressed gas from the compressor conveyed through the transport pipe.

BRIEF DESCRIPTION OF THE SEVERAL VIEWS OF THE DRAWINGS

The invention will be better understood upon reading the following description, provided solely as an example, and done in reference to the appended drawings, in which:

FIG. 3 is an overview flowchart showing the autonomous production assembly in a first operating phase on the ground;

FIG. 4 is a view similar to FIG. 3 during a second operating phase on the ground;

FIG. 7 is a view similar to FIG. 6 when an engine is restarted;

FIG. 8 is a view similar to FIG. 7 during a burnout of the engines;

DETAILED DESCRIPTION OF THE INVENTION

Hereafter, the terms "upstream" and "downstream" are generally used in reference to the normal direction of circulation of a fluid.

Figure 1:
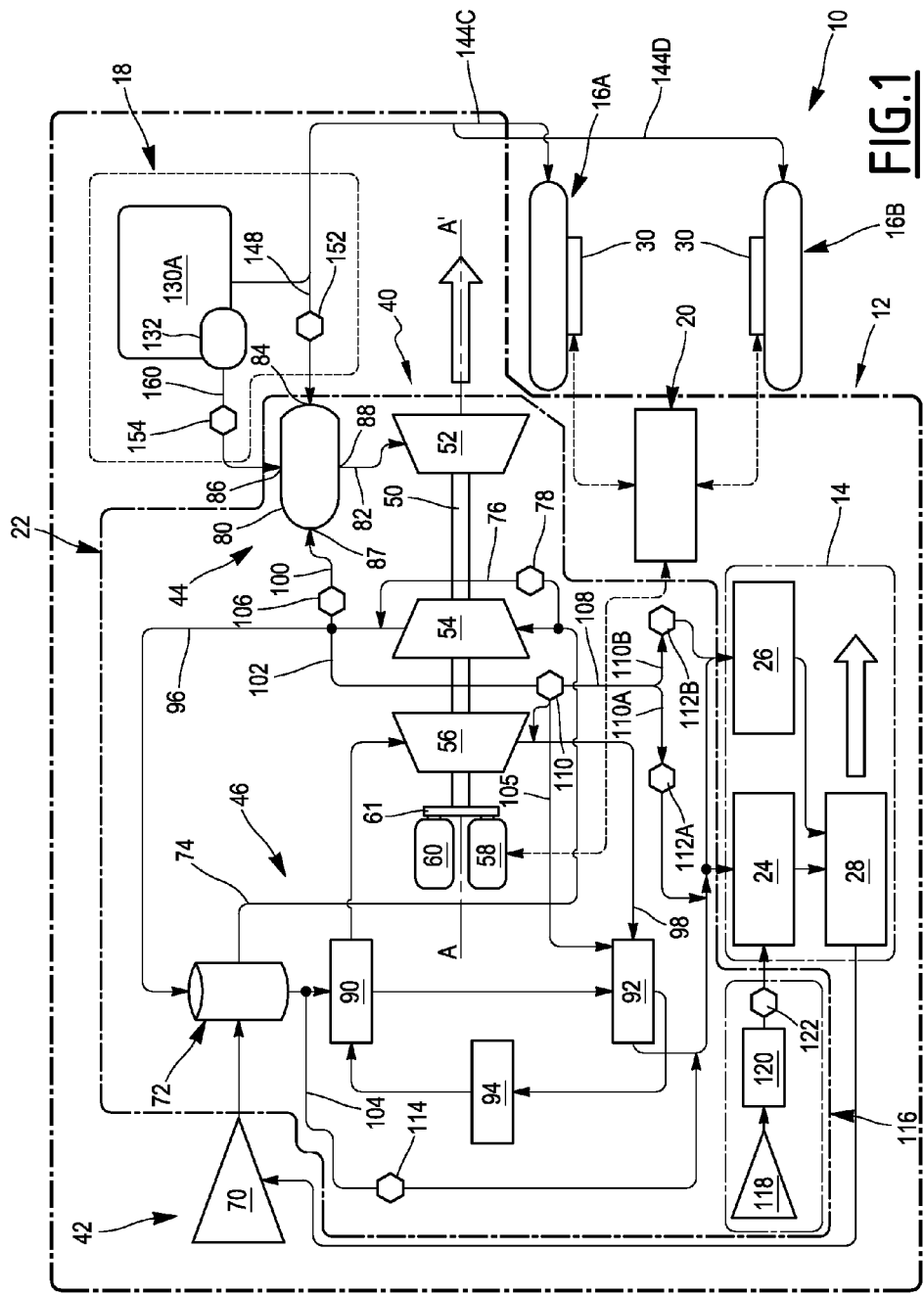
FIG. 1 is an overview flowchart of a first aircraft according to the invention, provided with an autonomous power generation and conditioning system, supplied by a fuel storage device according to the invention.

A first aircraft 10 according to the invention is diagrammatically illustrated by FIG. 1.

In a known manner, this aircraft 10 comprises a fuselage 12 delimiting an enclosure 14 designed to be conditioned, in particular in terms of temperature and pressure.

The aircraft 10 comprises at least one engine 16A, 16B, a fuel storage device 18, an electric network 20, and an autonomous electricity production and conditioning system 22.

The enclosure 14 comprises a cabin 24 intended to transport passengers and/or goods, a cockpit 26, intended to transport a crew piloting the aircraft 10, and a cargo compartment 28 intended to transport luggage and/or goods and/or functional equipment of the aircraft.

The passengers, luggage, goods and/or functional equipment must be transported under predefined temperature, pressure, and hygrometry conditions.

The gas present in the enclosure 14 is conditioned by the autonomous system 22 to have a particular temperature and pressure, independent of the temperature and pressure prevailing outside the aircraft 10.

Generally, the temperature of the gas present in the enclosure 14 is kept at a reference usually between 15° C. and 60° C. during operation of the zone of the aircraft to be conditioned. Likewise, the pressure of the gas in the enclosure 14 is kept between the atmospheric static pressure situated outside the aircraft, and that static pressure value plus 800 absolute millibars, depending on the areas of the airplane and the altitude thereof.

The aircraft 10 comprises at least one engine 16A, 16B intended for the propulsion thereof, in particular to enable the takeoff and maintenance in flight thereof.

In the example illustrated in FIG. 1, the aircraft 10 comprises two engines 16A, 16B, the number of engines 16A, 16B more generally being able to be between 1 and 4.

In this example, each engine 16A, 16B is a turbojet engine including a turbine rotated by the combustion of a liquid fuel (such as kerosene) to create thrust.

Each engine 16A, 16B is equipped with an element 30. In the case of an electric-start engine, this element is a main production alternator-starter which, when supplied with electricity, is capable of rotating the engine to ensure the ignition thereof. In the case of an air-start engine, this element 30 is a generator. In both cases, this element is rotatably mounted jointly with the turbine to create electricity transmitted to the electric network 20 when the engine 16A, 16B is active.

The electric network 20 is designed to supply the functional assemblies of the aircraft 10 with electricity.

The electric network 20 in particular powers a computer, in particular a flight control computer, pumps, navigational instruments, and services present in the cockpit 26 and the cabin 24.

As illustrated by FIG. 1, the autonomous system 22 forms an independent power module, capable of generating electricity, independently of the elements 30 (alternator-starters or generators), for example when the engines 16A, 16B are stopped.

The autonomous system 22 is also intended to condition the gas present in the enclosure 14, in particular by supplying a cooled compressed gas.

As illustrated in FIG. 1, the autonomous system 22 comprises a rotary assembly 40, an upstream assembly 42 for supplying outside air to the rotary assembly 40, a combustion assembly 44 for rotating the rotary assembly 40, and a downstream gas conditioning assembly 46.

The rotary assembly 40 comprises a single rotary shaft 50. It also comprises a power turbine 52, a compressor 54, and a cold turbine 56, which are mounted on the rotary shaft 50.

The rotary assembly 40 also comprises a main alternator 58 and, advantageously, an auxiliary alternator 60, the alternators 58, 60 being mechanically connected to the rotary shaft 50 by a transmission member 61 transmitting the rotational movement of the shaft.

The transmission member 61 is for example a rotational speed modifier capable of driving each alternator 58, 60 at a speed of rotation distinct from that of the shaft 50, such as a speed reducer.

Alternatively, at least one alternator 58, 60 is directly supported on the shaft 50.

As will be seen in more detail below, the rotary assembly 40 is designed to be driven around a shaft axis A-A' by the power turbine 52. This rotational driving causes the joint rotation of the compressor 54, the cold turbine 56, the main alternator 58, and the auxiliary alternator 60, by means of the transmission member 61, when one is present.

According to the invention, the upstream assembly 42 for supplying outside air is intended to supply the compressor 54 with air from outside the aircraft 10 not having passed through a propulsion engine 16A, 16B of the aircraft 10.

In this example, the supply assembly 42 comprises an outside air intake 70, an upstream heat exchanger 72, and an outside upstream air intake line 74 connecting the outside air intake 70 to a compressor intake 54, through the upstream exchanger 72.

Figure 10:
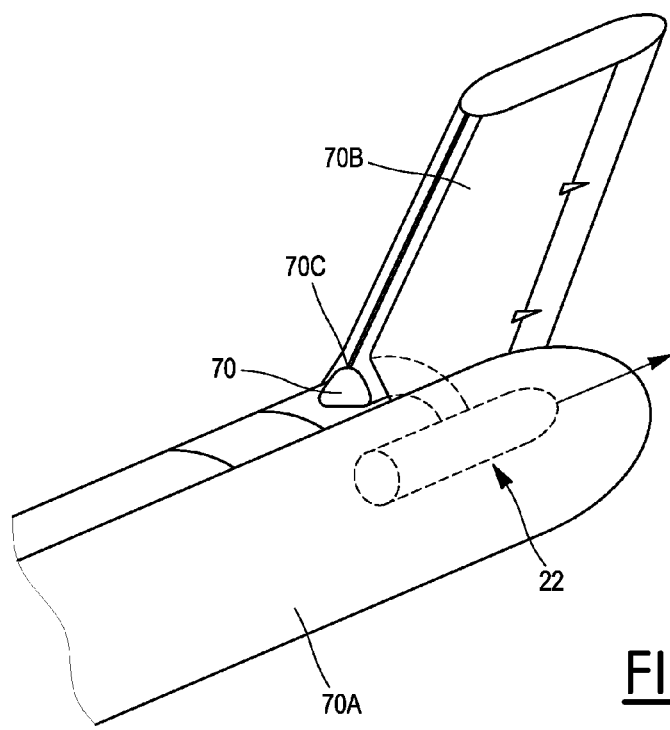
FIG. 10 is a partial perspective view of the rear portion of an aircraft according to the invention.

As illustrated by FIG. 10, the outside air intake 70 is for example formed in the fuselage 70A (FIG. 10) of the aircraft 10 to take outside air from the aircraft 10.

This intake may in particular be situated at the base of the vertical stabilizer 70B positioned at the rear of the fuselage, for example in a nozzle 70C.

Alternatively (not shown), the intake 70 is a scoop protruding relative to the fuselage.

According to the invention, the air intake 70 is positioned spaced away from the or each engine 16A, 16B. It is provided with fuel injection means. The outside air taken by the intake 70 does not come into contact with the fuel intended for propulsion of the aircraft 10.

The sizing of the air intake 70 is adapted to the size of the compressor 54 and is independent of the quantity of air present in the or each engine 16A, 16B to ensure the propulsion of the aircraft.

Furthermore, the outside air captured at the intake 70 is not used to create a thrust force on the aircraft.

In FIG. 1, a first outside air bypass line 76 is tapped on the air intake line 74 downstream of the exchanger 72, and upstream of the compressor 54, to supply outside air taken by the air intake 70 downstream of the compressor 54, without passing through the latter.

The first bypass line 76 is provided with a bypass valve 78 of the compressor 54.

The line 76 is intended to oppose the pumping phenomenon in the compressor 54.

The combustion assembly 44 comprises a combustion chamber 80 intended to produce a combustion gas having an increased enthalpy, and a channel 82 for supplying the power turbine 52 with combustion gas.

The combustion chamber 80 is intended to receive fuel coming from the storage device 18 either through a main inlet 84, or through a secondary inlet 86, as will be seen below. The main inlet 84 and the secondary inlet 86 are situated spaced apart from one another, as will be seen below.

The chamber 80 has a compressed air intake inlet 87 coming from the compressor 54 and a combustion gas outlet 88 on which the supply channel 82 is connected.

The chamber 80 is capable of receiving fuel coming from the storage device 18, performing the combustion thereof in the presence of compressed air received by the air intake inlet 87, to produce a gas discharged through the combustion gas outlet 88.

On the other hand, the combustion chamber 80 is incapable of creating a propulsion gas of the aircraft 10. It does not form an engine of the aircraft and is independent of the engine(s) 16A, 16B of the aircraft 10.

In particular, the combustion gases produced in the combustion chamber 80 are not intended or able to rotate a turbine of a propulsion engine 16A, 16B.

In this example, the downstream conditioning assembly 46 comprises a downstream heat exchanger 90, a condenser 92, a separator 94, and a line 96 for conveying the compressed gas in the compressor 54 toward the cold turbine 56. The transport line 96 successively passes through the upstream heat exchanger 72, the downstream heat exchanger 90, the condenser 92, the separator 94, then again through the heater 90, before reaching the cold turbine 56.

The downstream assembly 46 also comprises an expanded cold gas distribution line 98 connecting an output of the turbine 56 to the enclosure 14 through the condenser 92.

The downstream assembly 46 also comprises a compressed air bypass line 100 for supplying the combustion chamber 80.

In FIG. 1, the downstream assembly 46 comprises a direct compressed air bypass line 102 from the compressor 54 toward the enclosure 14, and a bypass line 104 for compressed gas from the exchanger 72 toward the enclosure 14.

The downstream assembly 46 also comprises a direct bypass line 105 of the compressed gas from the compressor 54 toward the cold turbine 56 and toward the condenser 92 to deice those elements.

The upstream heat exchanger 72 is capable of putting the compressed gas from the compressor 54 circulating in the transport line 96 in a heat exchange relationship with the outside air taken in the air intake 70 to cool the compressed gas and heat the outside air.

The downstream heat exchanger 90 is capable of putting the upstream compressed gas circulating in the transport line 96 at the outlet of the upstream heat exchanger 72 in a heat exchange relationship with the downstream compressed gas from the separator 94 circulating in the transport line 96, to heat the downstream compressed gas from the separator 94 and cool the upstream compressed gas at the outlet of the heat exchanger 72.

The condenser 92 is capable of putting the expanded cold gas from the turbine 56 in a heat exchange relationship with the compressed gas from the downstream heat exchanger 90 to cool and potentially partially condense the compressed gas.

The separator 94 is capable of eliminating the liquid phase of the partially condensed compressed gas in the condenser 92 to prevent that liquid phase from entering the cold turbine 56.

The compressed air bypass line 100 is tapped on the transport line 96 between the outlet of the compressor 54 and the heat exchanger 72. It emerges in the combustion chamber 80 at the compressed air supply inlet 87. It is provided with a control valve 106 for the flow of compressed air to be sent toward the combustion chamber 80.

The direct bypass line 102 comprises a shared upstream section 108 provided with a bypass valve 110 and two downstream sections 110A, 110B intended respectively to connect the cabin 24 and the cockpit 26. Each of the sections 110A, 110B is provided with a valve 112A, 112B for controlling the injected flow rate.

The compressed gas bypass line 104 is tapped upstream on the transport line 96 between the upstream heat exchanger 72 and the downstream heat exchanger 90. It emerges downstream on the distribution line 98, downstream of the condenser 92. It is provided with a control valve 114 for the bypassed compressed gas flow.

In FIG. 1, the autonomous power production and conditioning system 22 also comprises an auxiliary backup conditioning assembly 116.

This auxiliary assembly 116 includes a backup air intake 118, a backup heater 120, and a backup ventilation valve 122 that emerges in the enclosure 14.

The backup air intake 118 is independent and is distinct from the air intake 70. The backup heater 120 is independent from the combustion chamber 80 and the engines 16A, 16B. The heater 120 is advantageously an electric heater electrically powered by the network 20.

Figure 2:
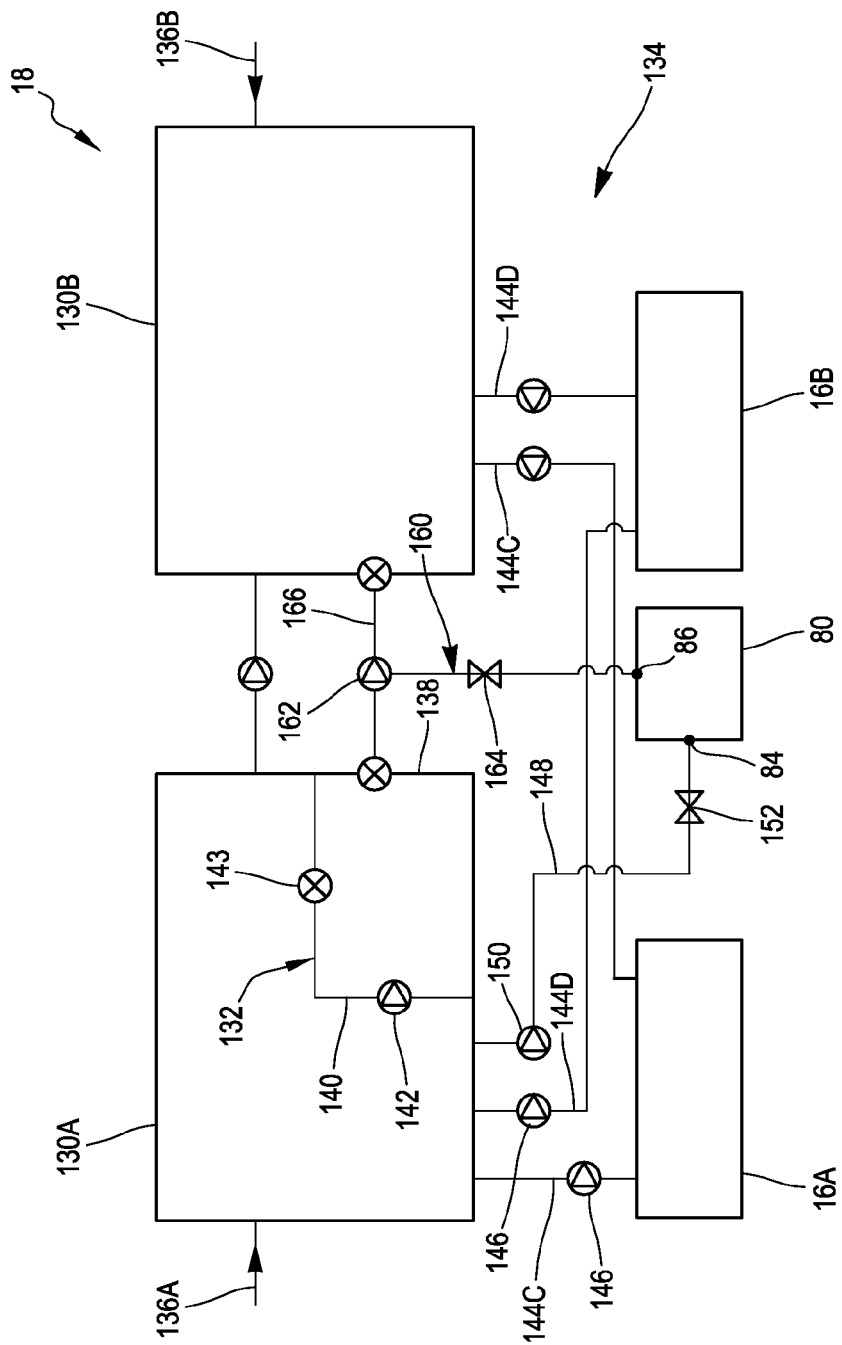
FIG. 2 is an overview flowchart of the fuel storage device according to the invention.

As illustrated in FIG. 2, the fuel storage device 18 comprises, according to the invention, at least one main reservoir 130A, 130B, at least one auxiliary reservoir 132 arranged in the main reservoir 130A, and a selective fuel distributor 134 toward the or each engine 16A, 16B and toward the combustion chamber 80.

As illustrated by FIG. 2, the aircraft 10 generally comprises a plurality of main reservoirs 130A, 130B arranged in the wings or in the fuselage 12 of the aircraft. Each main reservoir 130A, 130B can contain a first batch of liquid fuel intended to supply the engine(s) 16A, 16B for propulsion of the airplane.

Each main reservoir 130A, 130B is also intended to supply the combustion chamber 80 in a normal operating mode.

When several main reservoirs 130A, 130B are present, the reservoirs 130A, 130B are connected to one another to make it possible to balance the quantity of fuel in the various reservoirs 130A, 130B during the flight phases.

Each reservoir 130A, 130B is provided with an inlet 136A, 136B for supplying a first batch of fresh fuel, the inlet 136A, 136B being intended to fill the reservoir 130A, 130B between two flights.

According to the invention, the auxiliary reservoir 132 is intended to contain a second batch of fuel separate from the first batch of fuel. The second batch of fuel is for example made up of the first batch of fuel used during a preceding flight, or a batch of fuel obtained from another filling vehicle different from that used to fill the or each main reservoir 130A, 130B with fuel.

When a second filling vehicle is used, the second batch of fuel can be filtered and/or tested beforehand to verify the quality and reliability thereof.

In the embodiment illustrated in FIG. 2, the auxiliary reservoir 132 is positioned inside the main reservoir 130A. It advantageously shares at least one outer wall 138 with the main reservoir 130A. The auxiliary reservoir 132 is delimited by an insulating wall 140 sealed against the fuel present in the inner volume of the reservoir 130A containing it.

The volume of the auxiliary reservoir 132 is less than 15% of the volume of the main reservoir 130A.

The main reservoir 130A and the auxiliary reservoir 132 are connected to one another by a fuel exchange pump 142 between the main reservoir 130A and the auxiliary reservoir 132.

An overpressure valve 143 also connects the auxiliary reservoir 132 to the main reservoir 130A.

The insulating wall 140 is for example flexible and deformable so that the auxiliary reservoir 132 has a variable volume depending on the quantity of fuel contained in the auxiliary reservoir. Alternatively, the insulating wall 140 can be a rigid wall, defining a constant volume.

The distributor 134 comprises, for each main reservoir 130A, 130B, a supply line 144C, 144D connecting the reservoir 130A, 130B to each engine 16A, 16B.

Thus, in the example shown in FIG. 2, the first main reservoir 130A is connected to the first engine 16A by a first supply line 144C and is connected to the second engine 16B by a second supply line 144D. Likewise, the second main reservoir 130B is connected to the first reactor 16A by a first supply line 144C and to the second reactor 16B by a second supply line 144D.

Each of the supply lines 144C, 144D is provided with pumping means 146 for the first batch of fuel.

Furthermore, to make it possible to supply the combustion chamber 80, the distributor 134 comprises at least one first fuel intake line 148 into the combustion chamber 80 intended to convey, into the chamber 80, the first batch of fuel present in the main reservoir 130A. This line 148 is provided with a pump 150 and a flow rate control valve 152. The first line 148 emerges in the combustion chamber 80 through the main inlet 84.

According to the invention, the distributor 134 also comprises a second intake line 160 for bringing fuel into the combustion chamber 80 intended to convey the second batch of fuel present into the auxiliary reservoir 132.

The second intake line 160 supplies the chamber 80 exclusively with fuel from the second batch present in the auxiliary reservoir 132, without being mixed with or contaminated by the first batch of fuel present in the main reservoir 130A.

The second line 160 is provided with a backup auxiliary pump 162 and a flow rate control valve 164. The second line 160 emerges into the combustion chamber 80 through the secondary inlet 86, at a distance from the main inlet 84. This ensures that an obstruction of the main inlet 84 does not prevent the distribution of the second batch of fuel in the combustion chamber 80.

To ensure the renewal of the batch of fuel contained in the auxiliary reservoir 132, a discharge connection 166 is provided on the second intake line 160, downstream of the pump 162. This discharge connection 166 is for example oriented toward a discharge outside the aircraft 10 or to a main reservoir 130B.

To guarantee that the auxiliary reservoir 132 of the storage device 18 always comprises a second batch of fuel separate from the first batch and that is reliable, the filling method of the device 18 is as follows.

During the first filling of the reservoirs, before a flight of the aircraft 10, the main reservoir 130A, 130B is filled with a first batch of fuel through the inlet 136A, 136B.

The secondary reservoir 132 is filled with a second batch of fuel coming from a source distinct from the first batch of fuel supplied in the main reservoir 130A, 130B. In this way, two distinct fuel filling vehicles respectively containing the first batch of fuel and the second batch of fuel are generally used. The second batch of fuel can be filtered and/or tested beforehand to verify the integrity and reliability thereof.

During the flight, the first batch of fuel is used to supply the engines 16A, 16B for propulsion of the aircraft, through the supply lines 144A, 144B.

Once the aircraft 10 has landed and before a subsequent flight of the aircraft 10, part of the first batch of fuel present in the main reservoir 130A is conveyed toward the auxiliary reservoir 132, through the fuel exchange pump 142, after discharging the second batch of fuel present in the auxiliary reservoir 132 through the discharge connection 166.

The first batch of fuel having served for propulsion of the aircraft 10 during the earlier flight, it is considered reliable and healthy. This fuel then forms a second batch of fuel for the subsequent flight, the reliability of which is guaranteed.

Then, the main reservoir 130A is again filled with a new first batch of fuel.

This filling method guarantees that reliable fuel is always present in the auxiliary reservoir 132. This ensures that the combustion chamber 80 can be supplied with reliable fuel in case of emergency, as will be described below.

The operation of the autonomous power production and conditioning system 22 according to the invention will now be described, in the various embodiments thereof, using FIGS. 3 to 10.

Initially, in a machine startup mode, in reference to FIG. 3, the aircraft 10 is on the ground. The engines 16A, 16B are off.

To start the autonomous system 22, the electric network of the aircraft 20 comprising batteries is electrically connected to the auxiliary alternator 60 to supply said alternator 60 and cause it to operate as an engine. The rotation of the auxiliary alternator 60 makes it possible to test the proper operation thereof before each flight, so as to guarantee that it will be operational in case of emergency, and in particular in the event the main alternator 58 fails.

The rotational driving of the shaft 50 by the auxiliary alternator 60 causes the rotation of the compressor 54 and the suction of outside air through the air intake 70, and the outside air intake line 74. This outside air does not pass through a propulsion engine of the aircraft. It lacks fuel.

The valve 106 is then opened to make it possible to supply the combustion chamber 80 with the compressed air from the compressor 54 through the bypass line 100.

When the flow of air circulating toward the combustion chamber 80 through the bypass line 100 is sufficient, fuel from the main reservoir 130A, 130B is injected into the combustion chamber 80 through the supply line 148 and the valve 152.

The combustion chamber 80 is then ignited to cause the combustion of the fuel, which creates a pressurized combustion gas. The pressure of the combustion gas is for example greater than 1.5 bar, and the temperature thereof is higher than 600° C.

This combustion gas is then extracted through the supply channel 82 and is conveyed to the power turbine 52.

When the power turbine 52 has enough energy to rotate the shaft 50 independently, the auxiliary alternator 60 is deactivated.

Once this is done, in a nominal operating mode of the system 22 on the ground, or with engines off, shown in FIG. 4, a continuous flow of outside air is suctioned by the air intake 70 and the intake line 74. This outside air is injected at the inlet of the compressor 54 to produce a compressed gas delivered into the transport line 96.

The pressure of the compressed gas from the compressor 54 is for example greater than 1.5 bar (on the ground or at a low altitude, less than 15,000 feet).

Part of the compressed gas from the compressor 54 is then conveyed to the upstream heat exchanger 72.

Then, the compressed gas from the upstream heat exchanger 72 is introduced into the downstream heat exchanger 90 to be cooled therein. The compressed gas from the downstream heat exchanger 90 then goes into the condenser 92 to be partially condensed therein by heat exchange with the expanded gas from the cold turbine 56 circulating in the downstream line 98.

The partially condensed compressed gas then penetrates the separator 94, where the liquid fraction it contains is eliminated.

This compressed gas is then introduced into the downstream heat exchanger 90 to be heated therein by heat exchange with the compressed gas from the exchanger 72, before being introduced into the cold turbine 56.

Then, the compressed gas is expanded dynamically in the cold turbine 56 to produce an expanded gas cooled to a lower temperature comprised between 3° C. and 20° C. This temperature is below the temperature of the compressed gas from the compressor 54. The pressure of the expanded gas is at least greater than the reference pressure.

The expanded cooled gas is then passed into the condenser 92 through the downstream distribution line 98, before being distributed in the enclosure 14, in particular in the cabin 24, the cockpit 26, and the cargo area 28.

To that end, and to ensure the temperature, pressure, and hygrometry reference in the cabin 24 and the cockpit 26, the expanded cooled gas from the condenser 92 is mixed with pressurized compressed gas bypassed by means of the direct bypass line 102. The flow control valves 112A, 112B are thus selectively steered to guarantee a gas injection at a temperature, pressure, and hygrometry selectively commanded in the cabin 24 and the cockpit 26. Generally, the cargo area 28 is supplied with gas extracted outside the cabin 24 and the cockpit 26.

It is therefore possible to condition the gas present in the enclosure 14, even when the engines 16A, 16B are off. The system 22 is capable of performing that conditioning independently.

When the shaft 50 is rotated, the main alternator 58 operates as a generator and provides electric power to the electric network 20 of the aircraft, and in particular to the batteries present in the network 20.

Figure 5:
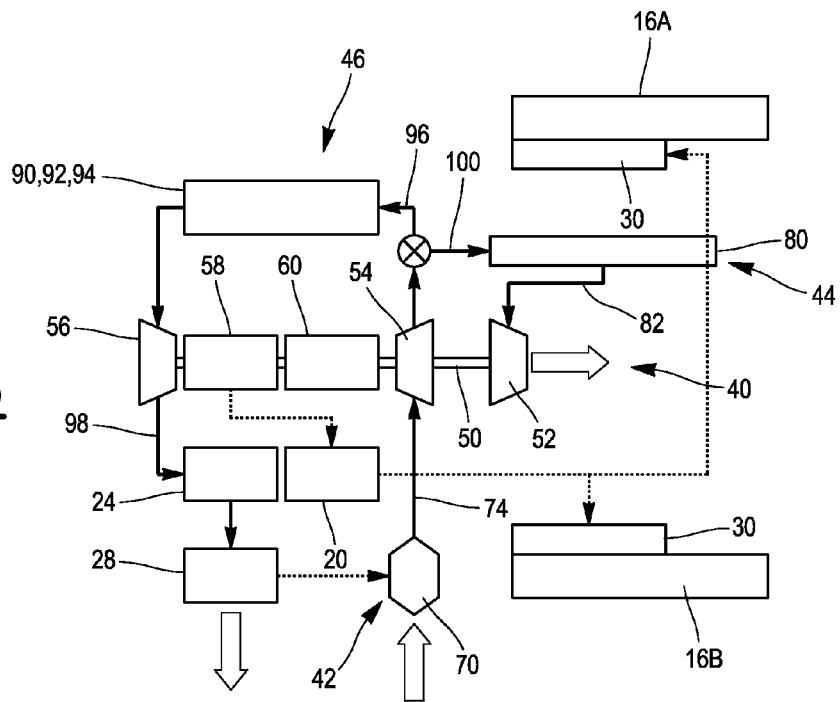
FIG. 5 is a view similar to FIG. 3 during ignition of the engine.

Then, in an electric-start mode of the engines 16A, 16B, in reference to FIG. 5, the engines 16A, 16B can be started up using alternator-starters 30.

To that end, the electric network 20 electrically powers each alternator-starter of the engine 30 so that it operates as an engine and rotates the turbine present in the engines 16A, 16B.

A flow of fuel present in the main reservoir 130A, 130B is then injected into the engines 16A, 16B through the intake lines 144C, 144D. The or each engine 16A, 16B is then started as illustrated in FIG. 6.

Once the or each engine 16A, 16B is started, the aircraft 10 can take off.

In an alternative air-start of the engines 16A, 16B, compressed gas from the compressor 54, taken upstream of the heat exchanger 72, is bypassed toward the or each engine 16A, 16B to rotate the turbines of those engines. The engine 16A, 16B is then started under the effect of that air circulation without it being necessary to use an alternator-starter, the sole purpose of the generator 30 in that case being to generate the current when the engines are operating.

Figure 6:
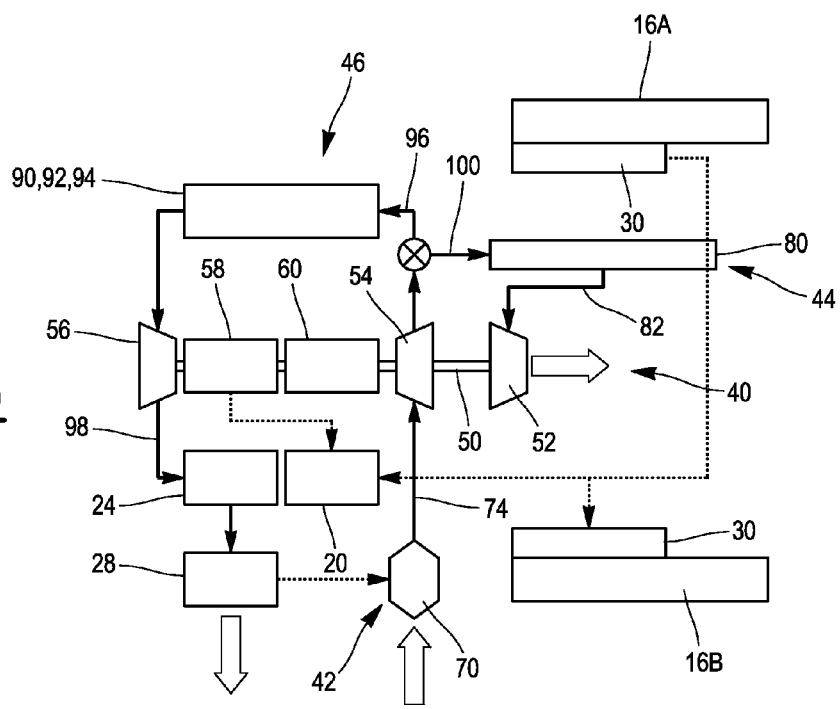
FIG. 6 is a view similar to FIG. 3 during a flight under normal conditions of the aircraft.

A "complementary electric cogeneration" nominal operating mode, during a flight phase or a ground phase with engines on, is shown in FIG. 6. In this mode, the elements 30 present on the engines 16A, 16B operate as generators and supply the electric network 20 with electricity.

Likewise, the combustion chamber 80 continues to operate continuously, independently relative to the engines 16A, 16B, which ensures the conditioning of the enclosure 14 as described above and which produces complementary electricity for the electric network 20 of the aircraft 10, in particular when additional electricity is necessary.

In an in-flight start-up mode shown in FIG. 7, where an engine 16A, 16B shuts down during flight, the engine 16A, 16B may be restarted from the electricity supplied by the independent production system 22 according to the invention.

In that case, the shaft 50 is rotated by supplying the power turbine 52 with combustion gas from the combustion chamber 80. The main alternator 58 then acts as an electricity generator powering the electric network 20. In the case of electric-start engines, this electricity is used to power the alternator-starter 30 of the engine 16A, 16B to be restarted. The alternator-starter 30 then operates as an engine.

Alternatively, the engine 16A, 16B is restarted with air using the compressed gas from the compressor 54, as previously described.

FIG. 8 illustrates the operation of the system 22 in a mode with a loss of main electricity production. Such a mode for example occurs in the event of total burnout of the engines 16A, 16B, i.e. when all of the engines 16A, 16B of the device are unusable, and/or when the alternator-starters (in alternator mode) or the generators 30 no longer supply electrical power.

During this emergency procedure, the first batch of fuel present in the main reservoir 130A, 130B can be considered a potential source of breakdowns (fuel pollution). In that case, to guarantee a minimal electricity supply for the essential functionalities of the aircraft, the second batch of fuel present in the auxiliary reservoir 132 is used.

To that end, the fuel present in the auxiliary reservoir 132 is transported through the second supply line 160 by means of the pump 162 and the flow control valve 164 to the combustion chamber 80.

The combustion chamber 80 is therefore supplied with fuel by a second batch of fuel that is healthy unreliable, since that fuel was used without problems during an earlier flight, or was specifically tested on the ground.

In the event the main alternator 58 is broken, the auxiliary alternator 60, which has been tested beforehand during the start-up of the aircraft 10, is used to operate as an electricity generator.

The rotation of the shaft 50, caused by the combustion of the second batch of fuel in the chamber 80, jointly rotates the auxiliary alternator 60. This creates a minimum quantity of electricity provided to the electric network 20 of the aircraft 10, for example between 6 kW and 50 kW. The minimal flight control and instrumentation functions of the aircraft 10 are thus ensured to allow the aircraft 10 tend to land.

A low flow of gas, shown by the arrows in broken lines in FIG. 8, can then circulate between the compressor 54, the turbine 56, the cabin 24, and the cargo area 28.

Figure 9:
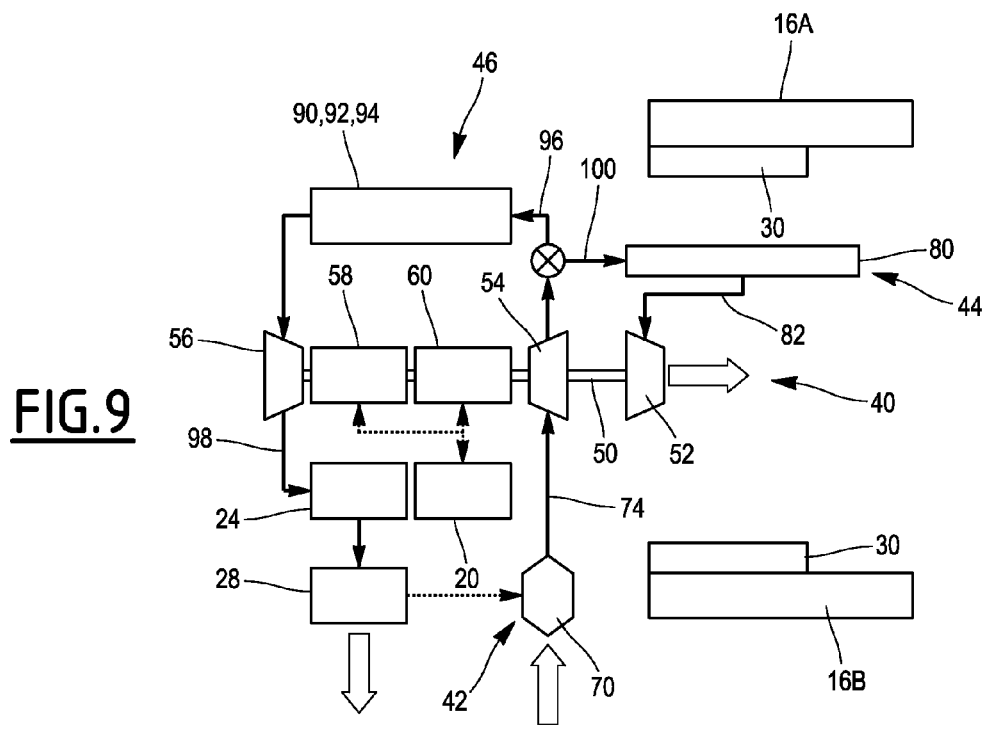
FIG. 9 is a view similar to FIG. 3 during maintenance operations.

FIG. 9 illustrates a maintenance mode of the aircraft 10, done on the ground, in which the main alternator 58 and/or the auxiliary alternator 60 are rotated from the combustion of a fuel in the combustion chamber 80 independent of the engine (s) 16A, 16B. The alternators 58, 60 are in particular tested in this mode to verify the proper operation thereof.

Figure 11:
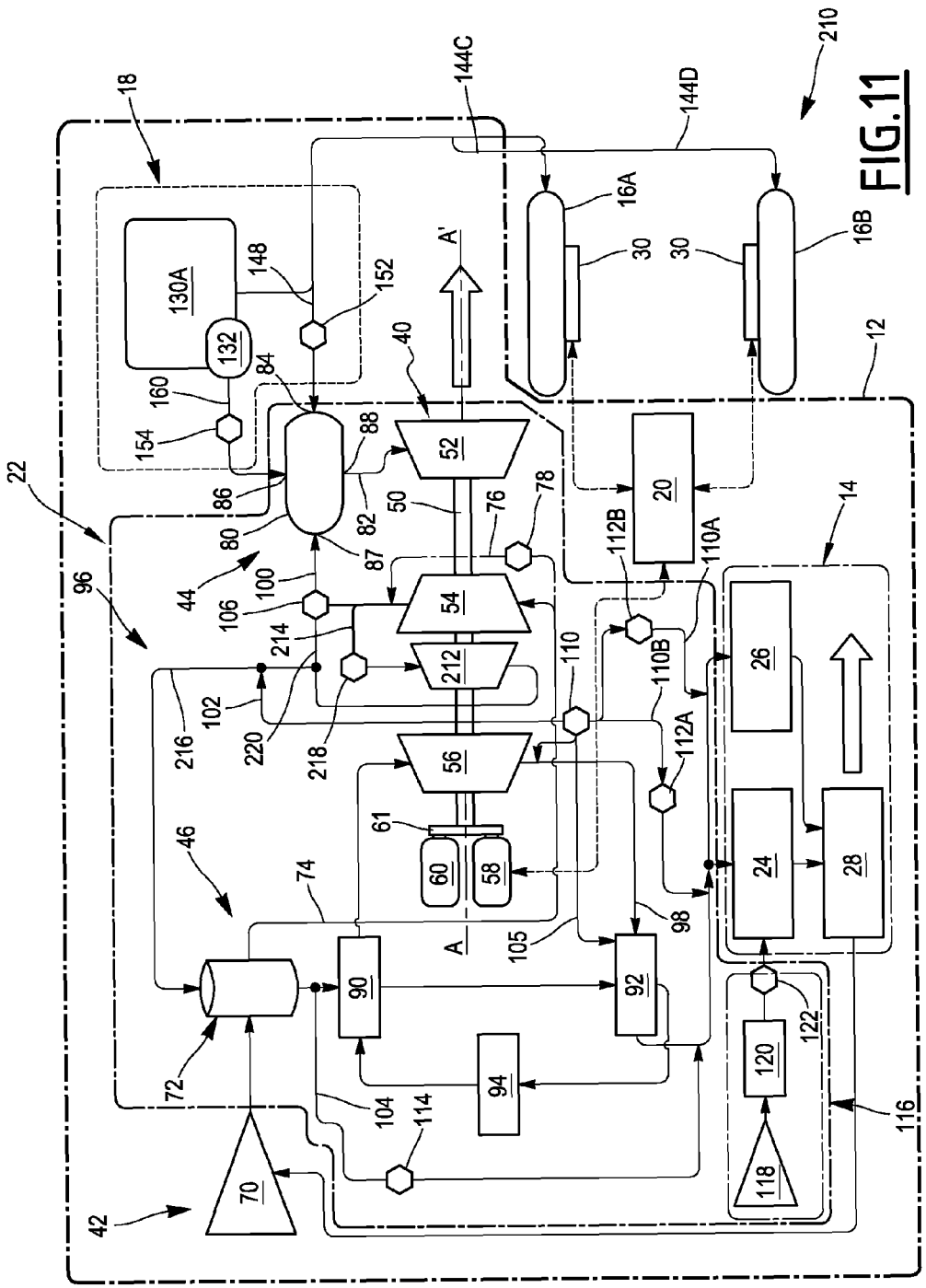
FIG. 11 is a view similar to FIG. 1 of a second aircraft according to the invention.

A second aircraft 210 according to the invention is illustrated in FIG. 11. Unlike the first aircraft 10, the rotary assembly 40 of the autonomous system 22 comprises an auxiliary compressor 212 in addition to the main compressor 54.

The transport line 96 thus comprises an upstream section 214 connecting the main compressor 54 to the auxiliary compressor 212, and a downstream section 216 connecting the auxiliary compressor 212 to the upstream heat exchanger 72 and then to the cold turbine 56.

The upstream section 214 is provided with an upstream supply valve 218 of the auxiliary compressor 212.

Unlike the first aircraft 10, the compressed air bypass line 100 is tapped on the upstream section 214, upstream of the upstream valve 218. A return bleed 220 connects the control valve 106 of the bypass line 100 to the downstream section 216, to produce a bypass around the downstream compressor 212.

The bypass line 102 is tapped on the downstream section 216, downstream of the auxiliary compressor 212, and upstream of the upstream exchanger 72.

The autonomous generation and conditioning system 22 is also similar to that of the first aircraft 10.

The operation of the autonomous system 22 of the second aircraft 210 differs from the operation of the independent system 22 of the first aircraft 10 in that the compressed gas current obtained at the outlet of the first compressor 54 first passes in the upstream section 214, through the upstream valve 218 as far as the auxiliary compressor 212.

A first portion of the gas current compressed at a first pressure in the first compressor 54 is bypassed toward the combustion chamber 80 through the bypass line 100 and the control valve 106, upstream of the auxiliary compressor 212.

A second portion of the compressed gas current is then recompressed in the auxiliary compressor 212 to reach a pressure greater than the pressure of the gas obtained at the outlet of the main compressor 54.

Then, the compressed gas from the auxiliary compressor 212 is oriented toward the cold turbine 54 through the main exchanger 72, the downstream heat exchanger 90, the condenser 92, the separator 94, and the downstream heat exchanger 90 again, as previously described.

In one alternative, the compressed gas from the upstream exchanger 72 is sent directly into the enclosure 14 by means of the compressed gas bypass line 104 and the control valve 114, without passing through the cold turbine 56.

Figure 12:
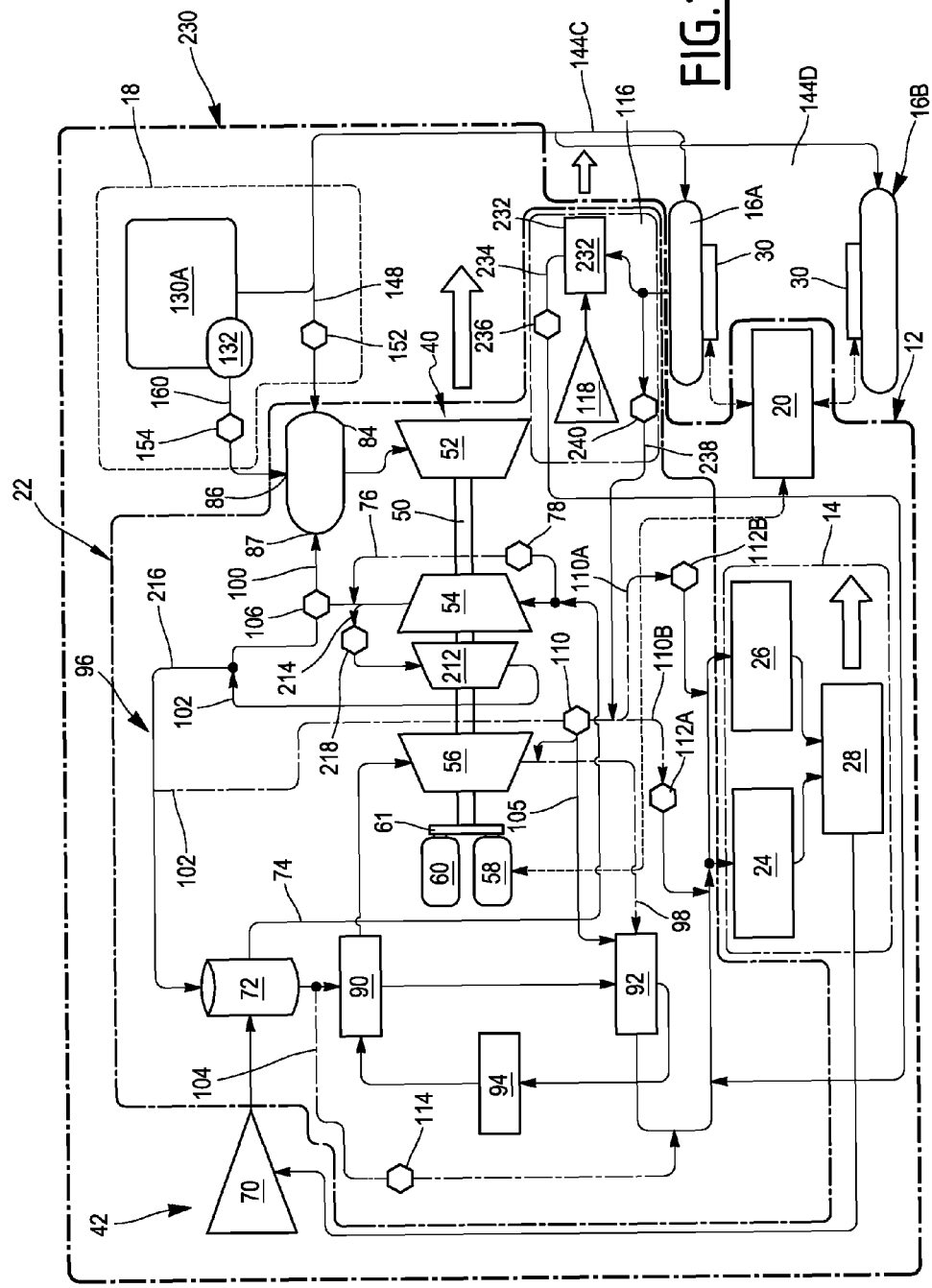
FIG. 12 is a view similar to FIG. 1 of a third aircraft according to the invention.

A third aircraft 230 according to the invention is diagrammatically illustrated by FIG. 12.

The third aircraft 230 differs from the second aircraft 210 in that the auxiliary conditioning assembly 116 comprises a backup heat exchanger 232 replacing the heater 120. The exchanger 232 is capable of putting a hot gas current taken from a propulsion engine 16A of the aircraft in a heat exchange relationship with a current of outside air taken through the backup air intake 118.

The outside air current thus heated is brought toward the enclosure 14 by a backup cold air intake line 234 provided with a control valve 236 for controlling the backup cold air flow rate.

Furthermore, the auxiliary assembly 116 comprises a hot air intake line 238 from a propulsion engine 16A of the aircraft emerging in the enclosure 14. The line 238 is provided with a control valve 240 for the backup hot air flow sent toward the enclosure 14.

In the event the autonomous system 22 fails, cold air is taken through the backup air intake 118. This cold air is partially heated in the backup exchanger 232, before being at least partially transported toward the enclosure 14 through the line 234 and the valve 236.

Hot air can also be provided to balance the temperature. This hot air is taken directly in the propulsion engine 16A of the aircraft and is conveyed toward the enclosure 14 through the hot air intake line 238 and the control valve 240.

Figure 13:
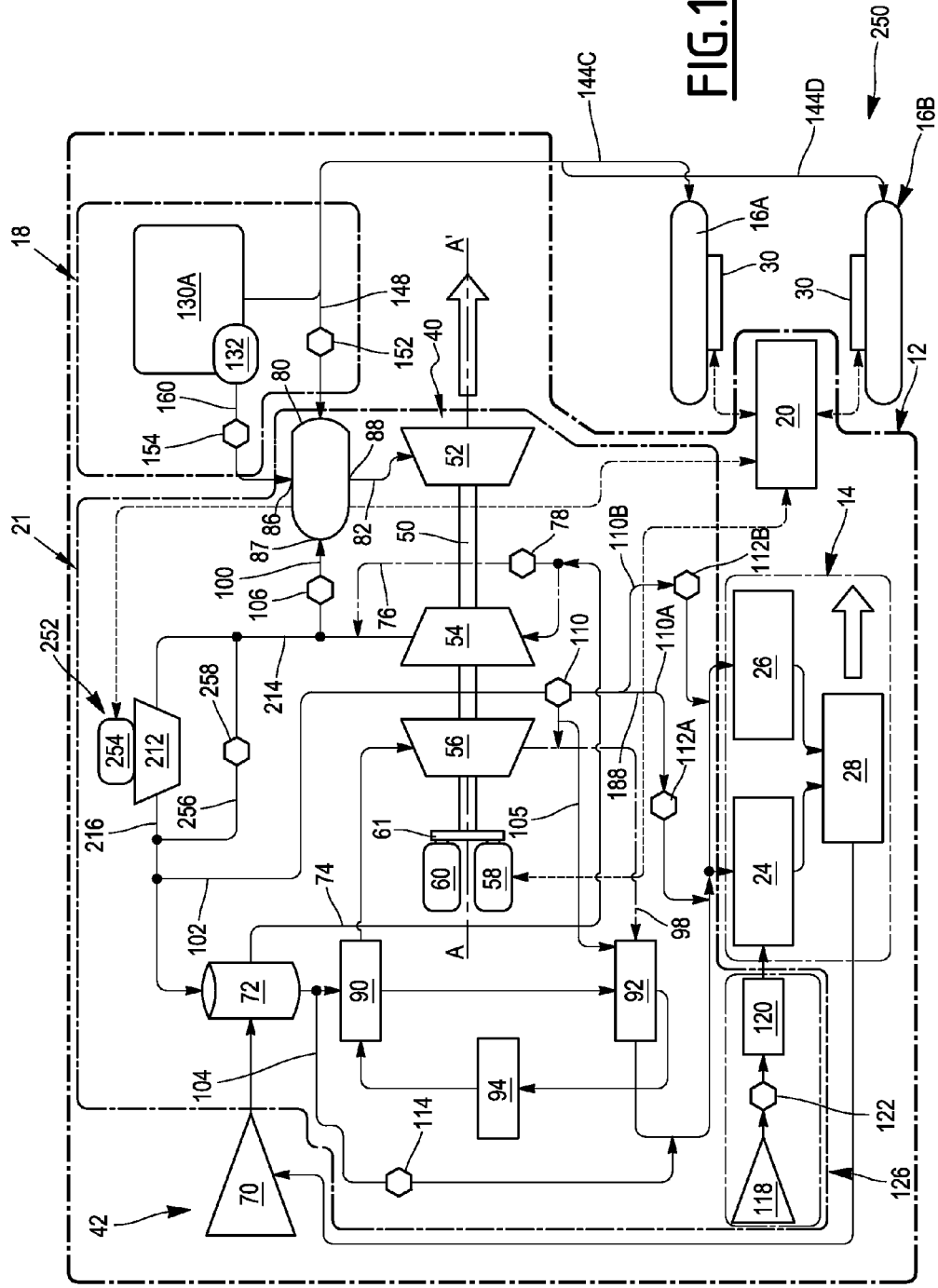
FIG. 13 is a view similar to FIG. 1 of a fourth aircraft returned to the invention.

A fourth aircraft 250 according to the invention is illustrated by FIG. 13.

Unlike the second aircraft 210 according to the invention, the rotary assembly 40 does not have an auxiliary compressor.

The production assembly 22 comprises an intermediate compression module 252 comprising an auxiliary compressor 212 driven independently by an engine 254 mechanically independent of the power turbine 52 and the rotation of the shaft 50.

The auxiliary engine 254 is for example an electric motor rotated by means of electricity supplied by the electric network 20 of the aircraft 250. Alternatively, the engine 254 is supplied with a combustion gas from the combustion chamber 80.

As previously described, the transport line 96 includes an upstream section 214 extending between the outlet of the main compressor 54 and the inlet of the auxiliary compressor 212 and a downstream section 216 extending between the outlet of the auxiliary compressor 212 and the inlet of the cold turbine 56.

In one advantageous alternative, a bypass line 256 of the auxiliary compressor 212 is provided with a bypass valve 258 and connects a point upstream of the auxiliary compressor 212 to a point situated downstream of the auxiliary compressor 212.

The operation of the fourth aircraft 250 differs from the operation of the second aircraft 210 in that electricity is supplied to the engine 254 by the electric network 20 to rotate the auxiliary compressor 212 when the main compressor 54 is rotated by the shaft 50 under the effect of the rotation of the power turbine 52.

Alternatively, the compressor 54 is partially supplied by a gas current coming from a propulsion engine 16A, 16B, in addition to the supply of outside air from the upstream assembly 42.

Owing to the described invention, it is therefore possible to have an autonomous electricity production and conditioning system 22, which has a compact structure. The autonomous system 22 guarantees complete independence between the thermodynamic operation of the propulsion engine(s) 16A, 16B of the aircraft, the electricity production necessary for the services of the aircraft, and the conditioning of the gas present in the enclosure 14 of the aircraft.

Such an arrangement significantly reduces the weight and bulk of the aircraft, while ensuring minimum fuel consumption.

The presence of a fuel storage device 18 according to the invention provided with an auxiliary reservoir containing a second batch of fuel separate from the first batch of fuel present in the main reservoir 130A, 130B guarantees an absence of contamination and a potential energy source for the aircraft, in particular when the engines 16A, 16B of the aircraft are not capable of propelling it and creating enough electricity.

When the device 18 is used in combination with an auxiliary alternator 60 that is not used under normal flight conditions, but which is tested at the beginning of each flight, the aircraft has an autonomous system 22 capable of particularly safely producing backup electricity offsetting a major failure of the propulsion engine(s) 16A, 16B as described in the main electricity production loss mode illustrated by FIG. 8. Such a system could replace a traditional backup energy production device of the Run Air Turbine type. This system 22 is significantly more reliable relative to a RAT system comprising a wind turbine.

Figure 14:
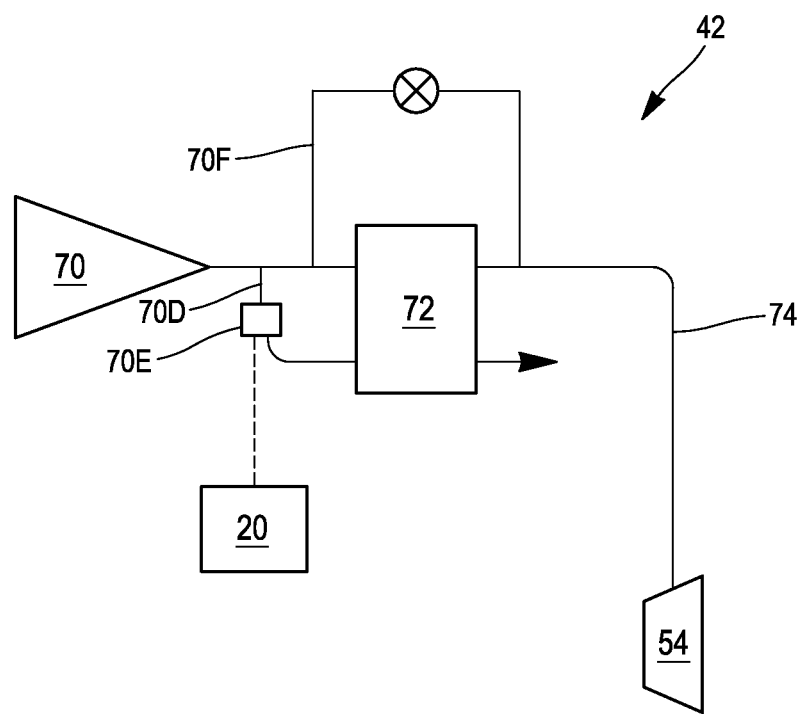
FIG. 14 is a view of an alternative assembly for providing outside air for the autonomous power production system.

In one alternative illustrated in FIG. 14, the upstream air supply assembly 42 comprises an auxiliary supply bleed 70D for circulating outside air toward the upstream heat exchanger 72. The auxiliary supply bleed 70D is tapped upstream of the upstream heat exchanger 72 on the upstream line 74. It passes through the upstream heat exchanger 72. It comprises, upstream or downstream of the upstream heat exchanger 72, a movable outside air driving member, such as a propeller 70E. The propeller 70E is electrically powered by the electric network of the airplane 20.

This arrangement supplies a sufficient quantity of outside air circulating through the exchanger 72, in particular when the aircraft 10 is stopped, or on the ground.

In this arrangement, an additional bypass line 70F can be provided on the line 74, to go around the heat exchanger 72 and supply the compressor 54 directly.

In alternatives, the system 22 does not have a line 76, a line 102, a line 105, or a return bleed 220. It may also be provided without an auxiliary assembly 116.

"Line" generally refers, within the meaning of the present invention, to any hollow element capable of transporting a fluid between two points, and not necessarily a tubular element.

The invention claimed is:

1. An autonomous electricity production and conditioning system for an aircraft, including:
    a rotary shaft;
    a main compressor mounted integral with the rotary shaft;
    a power turbine for rotating the rotary shaft; and
    a cold expansion turbine rotated by the rotary shaft and supplied with a compressed gas from the main compressor;
    wherein the system comprises an upstream assembly supplying outside air to the aircraft, which outside air has not passed through a propulsion engine of the aircraft, the upstream assembly being connected to an inlet of the main compressor, the system also including a main alternator mechanically connected to the rotary shaft, and an auxiliary alternator separate from the main alternator, and wherein the auxiliary alternator is mechanically connected to the rotary shaft; and
    an electric network of the aircraft includes batteries which are electrically connectable to the auxiliary alternator to supply the auxiliary alternator with power and cause it to operate as an engine to start rotation of the rotary shaft and electrically disconnectable from the auxiliary alternator when the power turbine rotates the rotary shaft independently, such that when the rotary shaft is rotated by the power turbine, the main alternator operates as a generator and provides electric power to the electric network of the aircraft.

2. The system according to claim 1, wherein the supply assembly includes an upstream heat exchanger for placing the air outside the aircraft, not having passed through a propulsion engine of the aircraft, in a heat exchange relationship with at least part of the compressed gas from the main compressor.

3. The system according to claim 1, including a downstream heat exchanger, a condenser, and a separator that receive at least part of the compressed gas from the main compressor, to produce a compressed gas to be introduced into the cold turbine, the condenser placing a cooled expanded gas from the cold turbine in heat exchange with a compressed gas from the downstream heat exchanger.

4. The system according to claim 1, including at least one gas distribution hose for conducting an expanded gas from the cold turbine toward an enclosure of the aircraft to be conditioned.

5. An aircraft, comprising a system according to claim 1 and a fuel storage device,
the fuel storage device comprising:
at least one main reservoir to contain a first batch of fuel;
at least one feed line for supplying a propulsion engine of the aircraft with the first batch of fuel contained in the at least one main reservoir; and
at least one auxiliary reservoir to contain a second batch of fuel separate from the first batch of fuel, the auxiliary reservoir being connected to the at least one main reservoir, the storage device including an intake line for bringing the second batch of fuel contained in the at least one auxiliary reservoir toward a combustion chamber of the aircraft independent of any engine of the aircraft.

6. The system according to claim 1, including a combustion chamber, independent of any propulsion engine of the aircraft, the system including a channel for supplying the power turbine with at least one combustion gas from the combustion chamber.

7. The system of claim 6 including:
at least one fuel reservoir to contain a first batch of fuel to supply the propulsion engine for propulsion of the aircraft; and
means for conveying fuel from the at least one fuel reservoir to the combustion chamber.

8. The system according to claim 6, including a withdrawal hose for withdrawing a compressed gas from the main compressor emerging in the combustion chamber.

9. The system according to claim 8, including an auxiliary compressor arranged downstream of the main compressor and upstream of the cold turbine to receive at least part of the compressed gas from the main compressor, the withdrawal hose being tapped between the main compressor and the auxiliary compressor upstream of the auxiliary compressor.

10. The system according to claim 9, wherein the auxiliary compressor is rotated by the rotary shaft.

11. The system according to claim 1, including an auxiliary compressor positioned away from the rotary shaft, the system including an auxiliary motor for rotating the auxiliary compressor.

12. The system of claim 11 wherein the auxiliary motor is an electric motor rotated by electricity supplied by the electrical network of the aircraft.

13. The system according to claim 1, including a member for transmitting the rotating movement of the rotary shaft mechanically connected to the rotary shaft.

14. The system of claim 13 wherein the member for transmitting rotating movement to the rotary shaft is a speed reducer.

15. A method for conditioning an aircraft, including the following steps:
providing the autonomous system according to claim 1;
activating the power turbine to rotate the rotary shaft;
jointly rotating the main compressor and the expansion turbine; and
supplying the main compressor with air outside the aircraft not having passed through a propulsion engine of the aircraft; and
the method including a starting step in which the batteries of the electric network of the aircraft are electrically connected to the auxiliary alternator to supply the auxiliary alternator and cause it to operate as an engine, then deactivating the auxiliary alternator by disconnecting the batteries from the auxiliary alternator when the power turbine rotates the shaft independently, such that when the rotary shaft is rotated, the main alternator operates as a generator and provides electric power to the electric network of the aircraft.

16. The method according to claim 15, including the following steps:
activating a combustion chamber of the aircraft to produce a combustion gas;
supplying the power turbine with the combustion gas; and
withdrawing at least part of the compressed gas from the main compressor to supply the combustion chamber.

* * * * *